(12) United States Patent
Gregg et al.

(10) Patent No.: US 7,260,663 B2
(45) Date of Patent: Aug. 21, 2007

(54) SYSTEM AND METHOD FOR PRESENTING INTERRUPTS

(75) Inventors: Thomas A. Gregg, Highland, NY (US); Richard L. Arndt, Austin, TX (US); David Craddock, New Paltz, NY (US); Richard K. Errickson, Poughkeepsie, NY (US); Ronald E. Fuhs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 11/100,845

(22) Filed: Apr. 7, 2005

(65) Prior Publication Data

US 2006/0230208 A1 Oct. 12, 2006

(51) Int. Cl.
*G06F 13/24* (2006.01)
*G06F 3/00* (2006.01)
*G06F 13/28* (2006.01)

(52) U.S. Cl. .......................... 710/260; 710/22; 710/52; 710/263

(58) Field of Classification Search ................ 710/260, 710/52, 22, 263
See application file for complete search history.

(56) References Cited

U.S. PATENT DOCUMENTS

| | | | | |
|---|---|---|---|---|
| 5,010,482 A | * | 4/1991 | Keller et al. | 710/52 |
| 5,325,536 A | * | 6/1994 | Chang et al. | 710/263 |
| 5,771,387 A | * | 6/1998 | Young et al. | 710/260 |
| 6,148,321 A | * | 11/2000 | Hammond | 718/100 |
| 6,442,634 B2 | * | 8/2002 | Bronson et al. | 710/260 |
| 6,553,443 B1 | * | 4/2003 | Baqai et al. | 710/264 |
| 6,622,193 B1 | | 9/2003 | Avery | |
| 6,718,370 B1 | * | 4/2004 | Coffman et al. | 709/212 |
| 6,760,783 B1 | | 7/2004 | Berry | |
| 6,868,087 B1 | * | 3/2005 | Agarwala et al. | 370/412 |
| 7,007,126 B2 | * | 2/2006 | Gillespie et al. | 710/306 |
| 7,039,472 B2 | * | 5/2006 | Sugimoto et al. | 700/14 |
| 2002/0141424 A1 | | 10/2002 | Gasbarro et al. | |
| 2002/0144001 A1 | | 10/2002 | Collins et al. | |
| 2003/0065856 A1 | | 4/2003 | Kagan et al. | |
| 2003/0084241 A1 | | 5/2003 | Lubbers et al. | |
| 2004/0028043 A1 | | 2/2004 | Maveli et al. | |
| 2004/0030745 A1 | | 2/2004 | Boucher et al. | |
| 2004/0139240 A1 | | 7/2004 | DiCorpo et al. | |
| 2004/0202189 A1 | | 10/2004 | Arndt et al. | |
| 2004/0215848 A1 | | 10/2004 | Craddock et al. | |
| 2005/0216635 A1 | * | 9/2005 | Nishimura | 710/260 |

* cited by examiner

*Primary Examiner*—Glenn A. Auve
*Assistant Examiner*—Christopher Daley
(74) *Attorney, Agent, or Firm*—John E. Campbell; Daryl K. Neff (57) ABSTRACT

An information processing system is provided which includes an interrupt table including a plurality of entries relating to interrupts requested by entries in a plurality of event queues. The entries of the interrupt table reference identifiers, and the identifiers are assigned to events from a pool of identifiers in accordance with an order in which the events occur.

20 Claims, 4 Drawing Sheets

SYSTEM AND METHOD FOR PRESENTING INTERRUPTS

BACKGROUND OF THE INVENTION

The present invention relates to information processing systems, and more particularly to a system and method for handling interrupts in an information processing system.

Information processing systems vary in the way that interrupts are presented, and then handled once they are presented. In some systems, responsibility for making sure that an interrupt gets the attention it demands rests with the processor which is the target of the interrupt. In other cases, responsibility for tracking the progress of presenting an interrupt and having it handled rests with one or more units of hardware and/or software other than the processor. For example, an interrupt handler which has access to on or more tables storing interrupt-related information, may have responsibility for tracking pending interrupts and making sure that each interrupts gets the required attention.

In processors which have an internal organization in accordance with the Peripheral Component Interface ("PCI"), the latter alternative is sometimes used. PCI defines a standard way of presenting interrupts. Interrupts in accordance with PCI have bus identifiers or ("BUIDs"), which identify the element of the information processing system that is the source of the interrupt. Each element of a system in accordance with PCI is uniquely identified by the BUID. In addition to the BUID, PCI provides four hardware interrupt lines from each input output ("I/O") adapter and multiple I/O adapters can be connected to one PCI host. These interrupt lines are used to define one of sixteen interrupt "LEVEL" values. When an interrupt in a PCI-enabled system is presented, it might not be handled immediately by a processor to which the interrupt is directed. In such case, information about the interrupt is stored in a table managed by hardware and/or software other than that of the target processor to which the interrupt is directed, and a mechanism is provided for presenting the interrupt to the target processor again at another time. In this way, responsibility for making sure the interrupt gets attention remains with that other hardware and/or software, rather than the processor to which the interrupt is directed.

In accordance with PCI, information about all interrupts in a processor or in a processor node of a network is stored in a single table. For smaller scale information processing systems which have few interrupting sources, this arrangement works well because an interrupt handler program need only scan one table of finite size to determine the status of outstanding interrupts.

However, for larger scale information processing systems, the table becomes very large, making it difficult to scan, and requiring significantly greater impact to processor cycles to scan, retrieve and update interrupt entries than in smaller scale systems.

InfiniBand™ (trademark of Infiniband Trade Association) architecture, referred to herein as "IBA", is implemented where appropriate for providing better performance and scalability at a lower cost, lower latency, improved usability and reliability. One way that IBA addresses reliability is by creating multiple redundant paths between nodes. IBA also represents a shift from load-and-store-based communication methods using shared local I/O busses to a more fault tolerant message passing approach.

Figure 1:
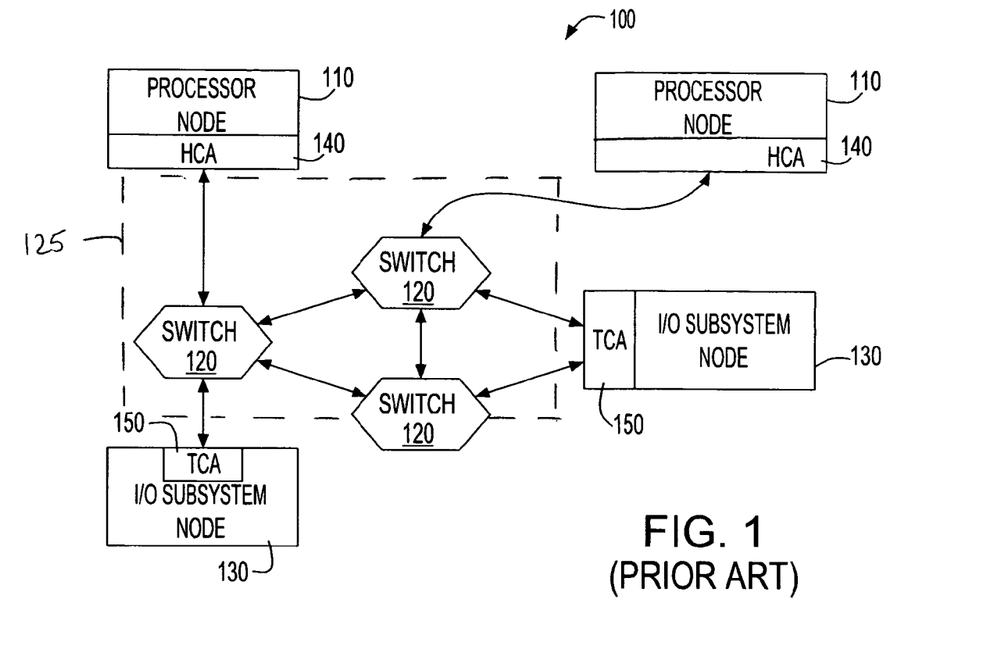
FIGS. 1-3 illustrate a method of presenting and tracking interrupts in accordance with the prior art.

FIG. 1 illustrates a prior art system area network 100 according to IBA. The network shown in FIG. 1 is constructed of a plurality of processor nodes 110, also referred to herein as "hosts", each of which includes one or more processors which function as a logical server at each processor node. As further shown in FIG. 1, the network has a switch fabric 125 including three switches 120 which connect processor nodes 110 and input output (I/O) system nodes 130 together. Each processor node 110 includes at least one host channel adapter ("HCA") 140 for managing communications across the switch fabric 125. I/O subsystem nodes 130 contain target channel adapters ("TCAs") 150, and, and like processor nodes 110, I/O subsystem nodes include one or more ports, and one or more QPs.

Each processor node 110 and each I/O subsystem node 130 connects to the switch fabric 125 through its respective HCA or TCA. Host and target channel adapters provide network interface services to overlying layers to allow such layers to generate and consume packets. When an application running on a processor node writes a file to a storage device, the processor node's HCA generates the packets that are then consumed by a storage device at one of the I/O subsystem nodes 130. Between the processor node and the I/O subsystem nodes, switches 120 route packets through the switch fabric 125. Switches 120 operate by forwarding packets between two of each switch's ports according to an established routing table and based on addressing information in the packets.

Figure 2:
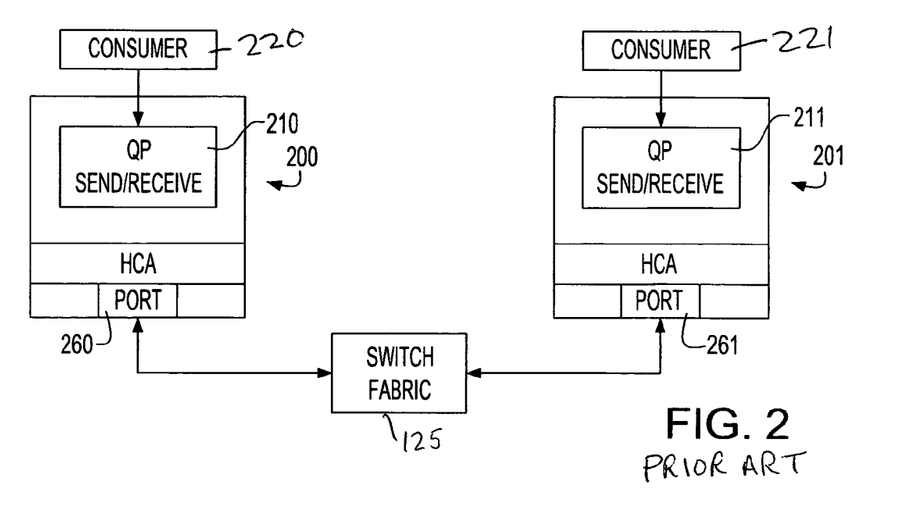

FIG. 2 is a prior art diagram further illustrating principles of communications in accordance with IBA. An application, i.e., a consumer 220, active on a first processor node 200 may require communication with another application, which is active as a consumer 221 on a second processor node 201 remote from the first processor node 200 but accessible through switch fabric 125. To communicate with the remote application, the applications on both processor nodes 200, 201 use work queues. Each work queue is implemented by a pair of queues, i.e., a "queue pair" ("QP") 210, or 211, which includes a send work queue and a receive work queue.

An application drives a communication operation by placing a work queue element (WQE) in the work queue. From the work queue, the communication operation is handled by the HCA. Thus, the work queue provides a communications medium between applications and the HCA, relieving the operating system from having to deal with this responsibility. Each application may create one or more work queues for the purpose of communicating with other applications or other elements of the system area network.

Event handling is a major part of controlling communication between nodes of a system area network constructed in accordance with Infiniband architecture. Such networks have network adapters called "host channel adapters" ("HCAs") which manage message passing operations between "consumers", e.g., application programs operating on the "host", and other hosts or data repositories on the network. Events are used to provide notifications, e.g., for the purpose of reporting the completion of work queue elements, as well as errors which may occur during operation. In some types of networks, HCAs utilize event queues (EQs) for posting information regarding an event and its status within the network. Each EQ generates interrupts when certain conditions occur, such as errors or other conditions for which a processor's attention or intervention is either desired or required.

Certain minimum information is required whenever an interrupt is posted within a host. There must be an identification of the source of the interrupt; i.e., the element of the host that requires the processor's attention. There must also be an identification of a processor or group of processors to receive the interrupt. In addition, it is desirable to identify the priority the interrupt. For example, it is desirable and frequently necessary to characterize the severity of the event for which the processor's attention is requested. In such way, interrupts for high severity events can be handled quickly before a problem worsens, and handling of interrupts for low severity events is postponed until the target processor finishes doing higher priority work.

As discussed above, in systems utilizing PCI bus architecture, a unique "bus identifier" or ("BUID") is assigned to each of the various resources of a system ("system resources") which ordinarily generates interrupts. Interrupts according to PCI bus architecture also include an additional four-bit data field known as "LEVEL". These fields BUID and LEVEL are used in combination as "BUID.LEVEL" to identify the particular source of the interrupt.

In general, once an interrupt is generated, it needs to be tracked to assure that it gets the requested attention and that its handling is reported back to the interrupting source or other tracking entity, when appropriate. However, implementing a mechanism for tracking interrupts in advanced host systems can be problematic. As described above, IBA systems include event queues for reporting events. In an IBA implemented host system, there may be hundreds of event queues. An efficient way is needed to track the status of interrupts which are pending and those which have been serviced, given the hundreds of event queues that can generate interrupts.

In such host system, one way of tracking interrupts is to assign a different BUID to each event queue. The LEVEL bits are used to identify different interrupting sources that cause each interrupt to be generated. For example, in the prior art arrangement shown in FIG. 3, a plurality of event queues, i.e., Event Queue 0 (310), Event Queue 1 (311), etc., through Event Queue M (312) generate interrupts to processors Server 0 (320), Server 1 (321), Server 2 (322), etc., through Server J (323) of a host system. In this arrangement, the event queues are part of an interrupt source layer 330. The interrupts make calls to an interrupt presentation layer 340. The interrupt presentation layer 340 embodies the behavior of the processors 320 through 323 in responding to the interrupts presented thereto from the interrupt source layer 330.

Figure 3:
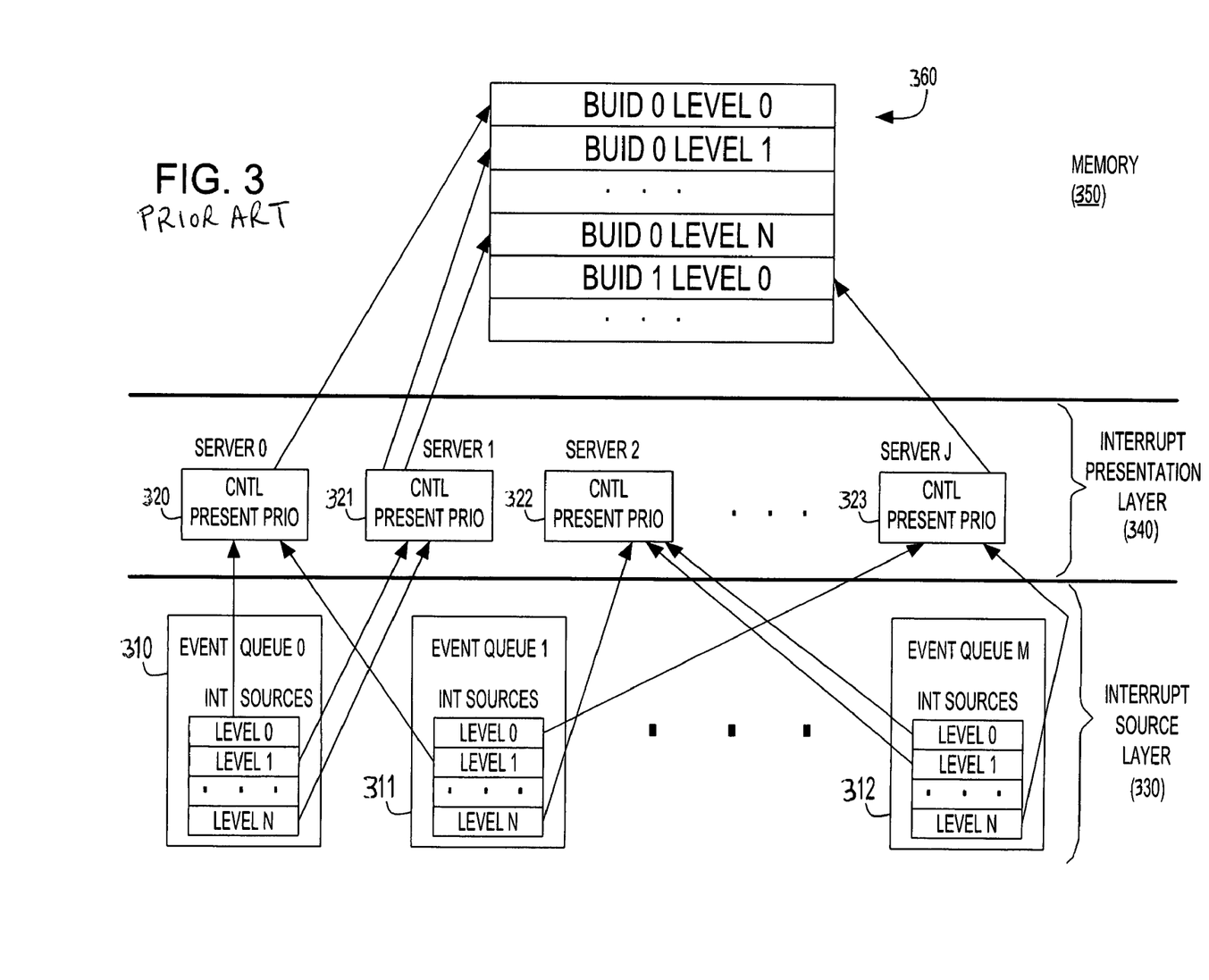

Typically, one event queue, e.g., EQ1 (311) will generate interrupts from the several sources that the event queue serves. For example, an event queue may record events for a group of sources such as the send work queue and the receive work queue of a queue pair, a completion queue, the event queue itself, and protection tables, etc. The sources tracked by the event queue can generate interrupts having different priority levels. Each interrupt may also change status during the time that it is tracked. In one implementation, all of these variables could be tracked by using different BUIDs and setting different LEVEL bits for the interrupt. In addition, a table 360 may be kept in main memory 350 for the host system, on which interrupt information is recorded and tracked.

However, this method has three deficiencies. First, in a basic implementation, the same BUIDs cannot be shared by multiple event queues. This usually limits the servicing of an interrupt having a particular BUID to a single processor or limits servicing to a single server number associated with a single thread which is executable on a single processor. Thus, there is a problem of facilitating and tracking interrupts to multiple processors and tracking interrupts to multiple threads on a single processor.

Another problem is that the BUID space for tracking interrupts can become sparse, such that long scans of memory are required to look up and alter entries in the table 360 on which interrupt information is recorded. The table 360 in main memory must maintain entries for every LEVEL of every BUID that is possible within the system. Thus, scanning such table to determine the status of an interrupt consumes much time just to find an entry relating to an active interrupt, given the large numbers of BUID.LEVEL combinations which can be present in the host system to represent all of the sources served by event queues.

Moreover, the BUID space could become even sparser in an arrangement which allows multiple processors to service one event queue, with attendant increases in the amount of memory and the time required to scan that memory. For the foregoing reasons, such arrangement is not well-suited for large scale host systems.

Finally, it is sometime necessary to send an interrupt for the same event to multiple processors to help assure that an interrupt is serviced quickly.

For the foregoing reasons, a new arrangement and method is desired for initiating and tracking interrupt information.

SUMMARY OF THE INVENTION

According to one aspect of the invention, an information processing system is provided which includes an interrupt table including a plurality of entries relating to interrupts requested by entries in a plurality of event queues. The entries of the interrupt table reference identifiers, and the identifiers are assigned to events from a pool of identifiers in accordance with an order in which the events occur.

In accordance with another aspect of the invention, an information processing system is provided which includes a plurality of event queues each containing a plurality of entries, wherein at least some of the entries include information for generating interrupts. The information processing system further includes an interrupt table including a plurality of interrupt table entries relating to interrupts requested by entries in the plurality of event queues. The interrupt table entries reference identifiers, and the identifiers are assigned to events from a pool of identifiers in accordance with an order in which the events occur. At least a first entry of one of the event queues references a second entry of another one of the event queues, and the first and the second entries include information for generating first and second interrupts for a single event, such that the first and second entries permit first and second interrupts to be generated for the single event.

In accordance with yet another aspect of the invention, a method is provided for processing interrupts in an information processing system. An interrupt table is provided which includes a plurality of entries relating to interrupts requested by entries in a plurality of event queues and the entries of the interrupt table reference identifiers. In such method, identifiers are assigned to the events of the event queues from a pool of identifiers in accordance with an order in which the events occur.

DETAILED DESCRIPTION

According to an embodiment of the invention, an information processing system is provided which streamlines the presentation of interrupts and management of pending interrupts by requiring event-driven interrupts to be presented via a single table managed by HCA hardware. Through use of the table, the number of different identifiers which distinguish the various interrupting sources from each other is reduced. By constraining interrupts to having only a relatively small number of different identifiers, a table in main memory that maintains interrupt information can be reduced in size. This reduces the overhead required to scan the table in main memory to locate and retrieve or update entries containing interrupt information.

Figure 4:
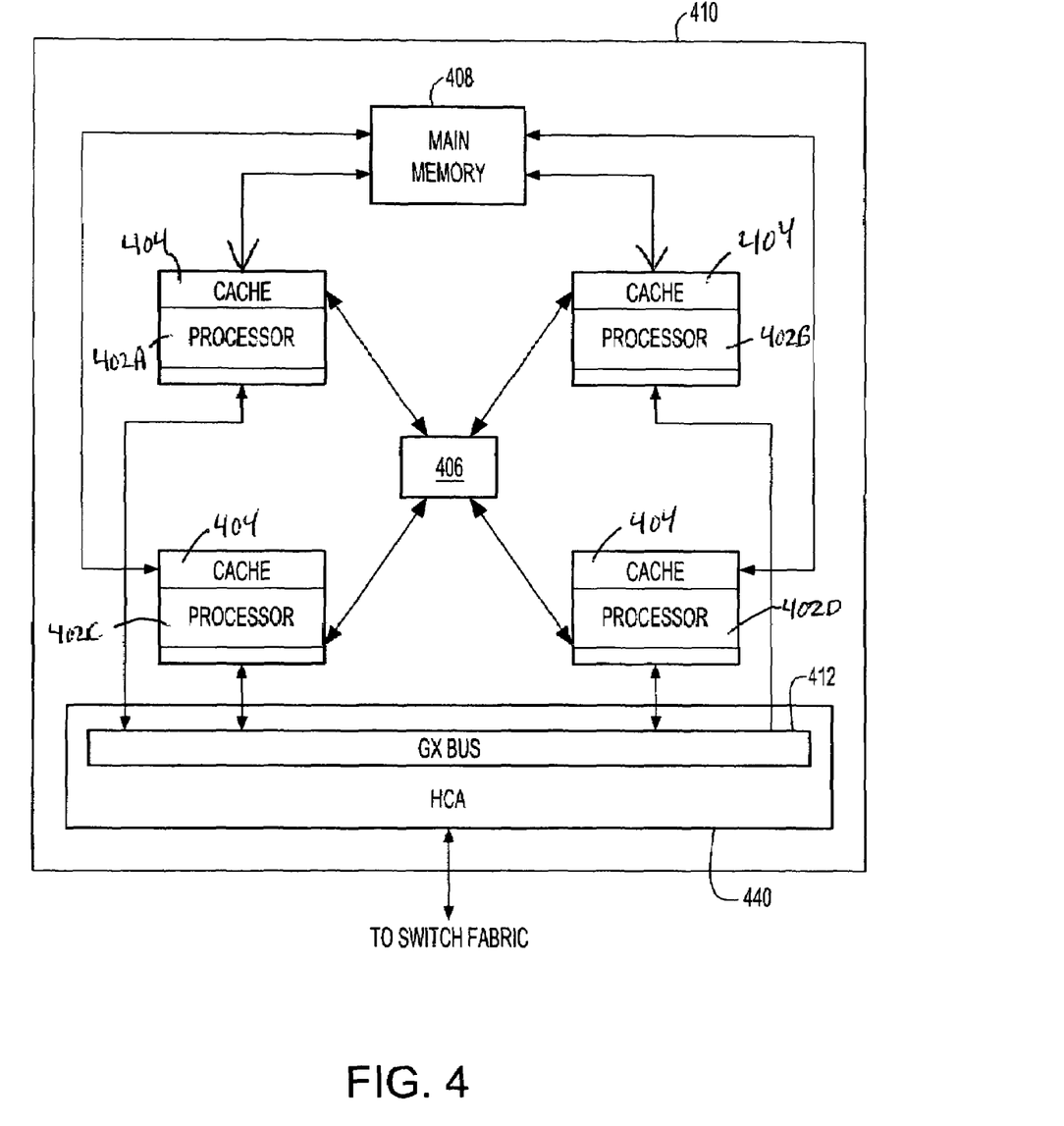
FIGS. 4-5 illustrate a method of presenting and tracking interrupts in accordance with embodiments of the invention.

FIG. 4 is a block and schematic diagram illustrating an internal organization of a processor node 410 within which an embodiment of the invention is implemented. The processor node 410 is preferably provided within a system area network, such as the system area network 100 shown in FIG. 1. A group of cooperating processors 402A, 402B, 402C and 402D are provided in such processor node 410. FIG. 4 illustrates a particular embodiment in which the number of cooperating processors is four. However, there can be a much greater or smaller number of processors within each processor node without changing the principles by which the embodiment of the invention operates. Each of the cooperating processors includes a cache 404. The cache 404 on each one of the processors is used to transmit operand data and/or instructions used in processing to another one of the processors, through the cache 404 of that other processor, and to receive such data from any other one of the processors through its own cache. A crosspoint connection switch 406 is provided which permits any one of the processors 402A through 402D to transmit and receive data from any other one of the processors. For example, the processor 402A transmits data to processor 402B by way of the caches 404 attached to those processors.

A main memory 408 is also provided within processor node 410. Processors are able to transfer data between caches 404 and the main memory 408 using typical caching operations. The processor node 410 also includes a host channel adapter ("HCA") 440 for communications between it and other processor nodes of a system area network, e.g., the system area network 100 illustrated in FIG. 1. Within the HCA, an interprocessor system input output bus is provided, which is referred to as a "GX bus" 412.

Figure 5:
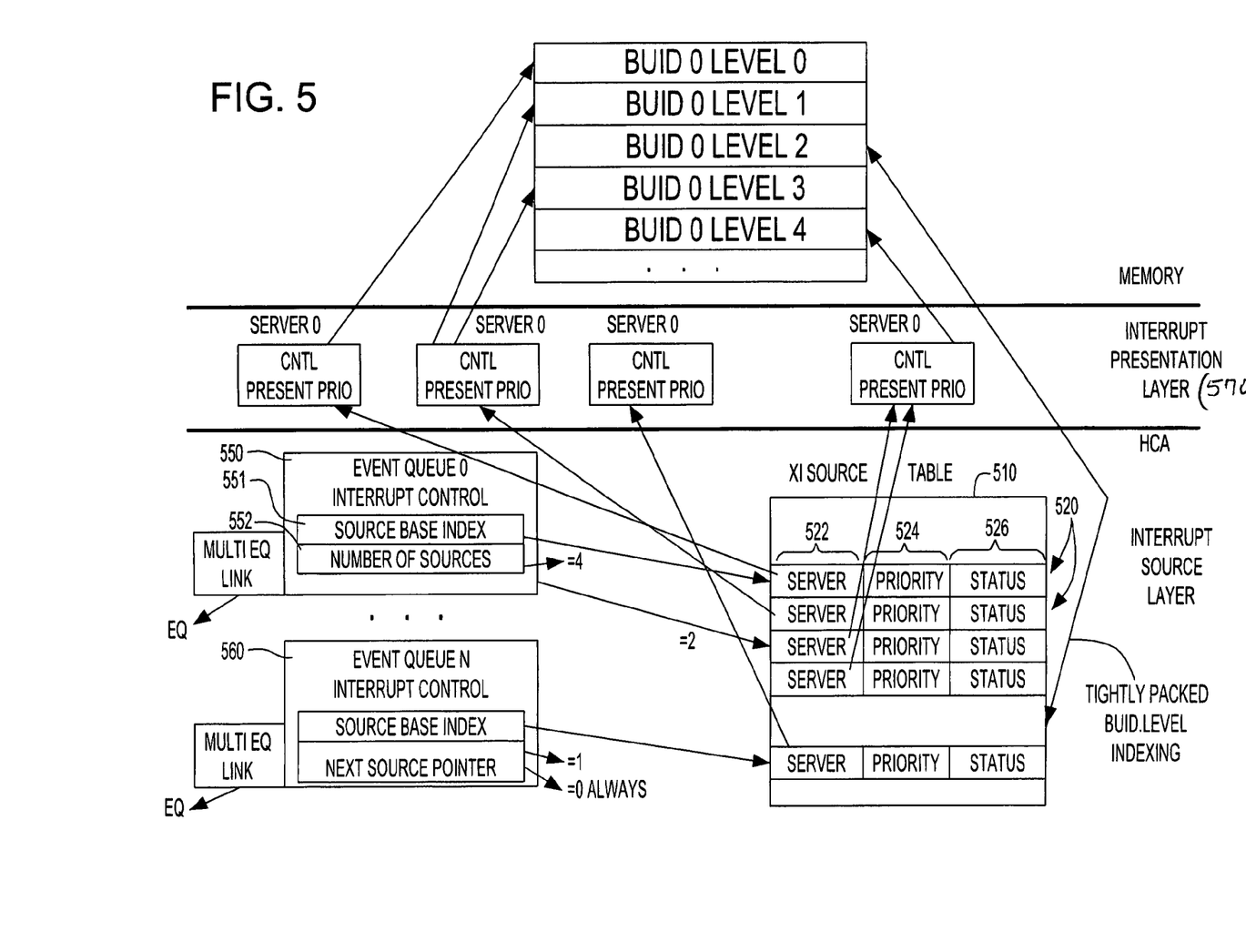

FIG. 5 is a diagram illustrating the handling and flow of different interrupt functions according to one embodiment of the invention. According to such embodiment of the invention, a set of hardware state machines control the presentation of interrupts to processors 402A, 402B, 402C, and 402B (FIG. 4) within the processor node. In the embodiment illustrated in FIG. 5, interrupts are presented to the respective processors by way of an external interrupt source table ("XIST") 510 over the GX bus 412. The location of each entry 520 in the XIST (hereinafter referred to as a "XIST entry") relative to the first entry in the table serves as an identifier identifying the source of an interrupt. Therefore, interrupts generated via the XIST identify their sources by the locations they appear within the XIST.

Each XIST entry includes a server number 522 or other server identification. The server number identifies one particular thread on one particular processor or group of processors of a processor node or a group of processors on multiple nodes to which the interrupt is directed. An interrupt to a processor requires attention by the identified thread of the identified processor. The XIST entry also includes a status field 526. This field indicates the status of the interrupt, from the viewpoint of the HCA. This field, typically encoded by two bits in the hardware, can be one of idle, pending, active, or returned. In addition, each entry in the XIST 510 includes a priority field 524. The priority field 524 is used to indicate the priority of the interrupt to the server to which the interrupt is directed. As further described below, a processor 402 (FIG. 4) uses the priority field to determine whether the interrupt has higher or lower priority than work that it is currently doing on a thread under the server number. When the priority of the interrupt is higher, the processor takes the interrupt; when the priority of the interrupt is lower, the processor returns the interrupt.

Many servers today can run either in basic mode or in logically partitioned ("LPAR") mode. Often times, a program executing on the processor node which has higher privileges than other programs, known as a "hypervisor", is used to prioritize tasks. When running in LPAR mode, the hypervisor program manages logical partitions ("LPARs"), each of which is capable of executing a separate operating system image. Each operating system image may utilize the same or a different operating system than that of other operating system images resident on the processor node. For each EQ of the processor node that utilizes the XIST, the hypervisor allocates a number of interrupt sources (usually more than one) in the XIST 510. The hypervisor initializes each entry 520 of the XIST 510 with an interrupt server number, such as may be known from stored information available to the hypervisor concerning the context of the EQ. Entries of the XIST are also initialized with an interrupt priority value, if the EQ is capable of generating interrupts having different priorities. The source status field of each entry is initially set to idle, as indicated by a zero value. Within each EQ, the hypervisor sets a XI source base index register (not shown) to the start of the group of sources in the XIST. The hypervisor also controls the maximum number of interrupts which can be allocated to EQs by setting a value in a capabilities register. Preferably, the maximum number specified by the hypervisor is the same as the total number of entries in the XIST.

FIG. 5 illustrates actions initiated from entries in a plurality of event queues ("EQs") which are maintained in the HCA of a particular processor node. While the HCA can contain a large number of EQs, for ease of reference only two such EQs are shown in FIG. 5: an event queue 0 or "EQ0" 550 and an event queue "N" or "EQN" 560. A complete set of event queues for an HCA will ordinarily include several event queues EQ0, EQ1, EQ2, . . . , EQN.

To generate an interrupt, each event queue points to a specific location in the XIST where interrupts relating to that event queue are to be entered. The XIST sets aside a limited number of entries for each of the event queues of the HCA, the entries being kept in a continuous range of the XIST. For example, in an example shown in FIG. 5, an EQ0 is allocated four entries in the XIST, and EQN is allocated only one entry in that table. Accordingly, each event queue is only able to have as many interrupts open at one time as it has entries set aside therefor in the event queue. Moreover, each event queue is preferably able to have only a limited number of interrupts for a particular type of event open at one time. Since each EQ must use only a defined range of the entries available in XIST, the location of each entry in the XIST serves as an identifier which identifies the particular EQ to be the source of the interrupt.

There are two ways for an event queue to reference the XIST and generate an interrupt entry on the XIST. Generally, the HCA will be configured for the EQ to reference the XIST in one or the other of these two different ways, not using both ways at the same time. In a first way, an EQ such as EQ0 (550) provides a source base index 551 to the XIST, the source base index identifying the starting entry number in the XIST where entries relating to that EQ are made. In this example, EQ0 also specifies the number of entries it is allowed to use in the XIST, through information it provides to the XIST as a "number of sources" field. In the example shown in FIG. 5, the EQ0 indicates to the XIST that it is allocated four entries in the XIST by passing information indicating that the value of the number of sources 552 is four. In this embodiment, the XIST then assigns any available one of the entries in the range of the XIST entries that are assigned to that EQ (EQ0). For the entry to be available, its status has to be marked "idle." With the information provided from the EQ, the XIST then generates the interrupt and presents it through an "interrupt presentation layer" 570 to a server image of a processor, as is described below.

In an alternative embodiment, the interrupting EQ does not provide a number of sources value to the XIST when generating an interrupt. Here, instead, an EQ such as "EQN" 560 provides the source base index 561, which as in the example above, identifies the starting entry number in the XIST where entries relating to that EQ (EQN) are made. The EQ also provides a pointer 562 as a "next source pointer" to a particular available entry in the XIST which it requests use in generating the interrupt. In this case, the EQ may select use of the same entry in the XIST each time the EQ requests an interrupt to be generated.

Alternatively, the EQ may select a different entry 520 of the XIST to be used each time it requests an interrupt to be generated. For example, the EQ may select the XIST entry in a "round-robin" fashion by selecting a different successively numbered XIST entry each time it requests an interrupt to be generated. As described above, each entry 520 in the XIST 510 contains a field 522 indicating the number of a particular server, i.e., a thread on a processor, which is to service the interrupt. In this way, different entries 520 in the XIST can generate interrupts to be presented to different servers. Thus, when the EQ selects the next entry of the XIST in such round-robin fashion, successively generated interrupts can be presented to different servers.

In an example of operation, when a particular event queue such as EQ0 has a hardware interrupt to generate, it provides the source base index 551 and number of sources 552 value to the XIST 510. The XIST logic then scans the group of sources for an available interrupt source. An available source is one that is in the idle state. If no available sources are found, no interrupt will be generated at that time. However, when an available interrupt source is found, an "interrupt request command" is sent over the GX bus 412 (FIG. 4) to a processor node. On the GX bus, the HCA generates a single identifier for the interrupt which contains information including the fields BUID and LEVEL concatenated with each other, for use with legacy systems which utilize these fields. The concatenated BUID.LEVEL identifier is drawn from the position of the entry within the XIST. The server number, interrupt priority, and status are also provided with the BUID.LEVEL identifier.

Each time the EQ needs to generate a hardware interrupt as determined by the control bits and interrupt timer logic, the HCA attempts to generate an interrupt request command on the GX bus, as described above. If there is an available interrupt source, the HCA moves the source from the idle to the pending state, and sends the interrupt request command over the GX bus. When the interrupt request command is then acknowledged over the GX bus, the HCA changes the status of the interrupt in the XIST from the pending to the active state. Thereafter, if the interrupt is accepted by the processor node, the processor node sends an "End of Interrupt" command back to the HCA. At that time, the HCA changes the status of the interrupt in the XIST from the active state back to the idle state.

However, if the processor node does not accept the interrupt, the processor node it sends an "Interrupt Return Command" back to the HCA. The HCA then changes the status of the interrupt in the XIST from the active state to the returned state. At a later time, the processor may want the returned interrupts to be reissued. In that case, a utility available the processor sends either an "Interrupt Reissue Command" or an "EOI/Reissue Command" over the GX bus to the HCA. The HCA then scans all of the interrupt sources, and for each source that is in the returned state, the HCA generates another interrupt request and changes the status of the interrupt in the XIST from the returned state to the active state. However, no interrupt reissue commands are generated for entries in the XIST that have the idle state.

In additional implementing details, a collection of registers (all denoted by XISTE) are shared by all of the EQs but are not part of the EQ context. In a particular embodiment, one such register exists for each source in the XIST and is supported by the HCA up to an architected maximum of 16384.

The first such register is the XISTE Interrupt Priority field (bits 56 through 63 in a preferred embodiment are set aside for this) is the interrupt priority in the "Interrupt Request Command" sent over the GX bus (beat 3, bits 4 through 11 in the preferred embodiment) to the processor node.

Next is the XISTE server number field (bits 48 through 55 in the preferred embodiment) is the interrupt server number in the interrupt request command sent over the GX bus (beat 3, bits 25 through 32 in the preferred embodiment) to the processor node.

The XISTE source state field (bits 6 and 7 in the preferred embodiment) indicates states of the source. These states are:

0=IDLE. Idle state indicates that no interrupt is pending for this source.

1=PENDING. This state indicates that the interrupt request command is queued in the HCA to be sent to the processor node.

2=ACTIVE. Active state denotes that an interrupt request command has been sent to the processor node for this source.

3=RETURNED. This state denotes that an interrupt request command was returned from the interrupt master (an interrupt return command was received from the processor node), and the source is waiting for the master to request it to be reissued.

Table 1, below, provides a sample bit assignment sequence for GX_XISTE as per one embodiment of the present invention.

TABLE 1

| Gx_XISTE Bit Assignment | | | | |
|---|---|---|---|---|
| Bits | Meaning | Software Access | Hardware Updated? | Default Value |
| 0:5 | Reserved | R | N/A | 0's |
| 6:7 | X1 Source State | R/W-I | Yes | 0's |
| 8:31 | Reserved | R | N/A | 0's |
| 32:47 | Reserved for Server Number field Extensions | R | N/A | 0's |

TABLE 1-continued

Gx_XISTE Bit Assignment

| Bits | Meaning | Software Access | Hardware Updated? | Default Value |
|---|---|---|---|---|
| 48:55 | Server Number | R/W | No | 0's |
| 56:63 | Interrupt Priority *A value of 0xFF in this field will be interpreted by hardware as disabling this interrupt source. | R/W | No | 0's |

BUID base register (G_BUIDBASE) is another register that is not part of the EQ context. It too is a general register shared by all of the EQs. In one embodiment of the present invention, there is only one such register for the entire HCA. In one embodiment of the present invention, this register is 16 bits long and the contents of this 16 bit register is added to the XI source number (the position in the XIST) to form the concatenated fields BUID.LEVEL in the interrupt request command (beat 2, bits 24 through 32; and beat 3, bits 0 through 3 in a preferred embodiment) sent over the GX bus towards the processor node. Table 2 below is provided as an example to show the bit assignment for this register as per one embodiment of the present invention.

TABLE 2

G_BUIDBASE Bit Assignment

| Bits | Meaning | Software Access | Hardware Updated? | Default Value |
|---|---|---|---|---|
| 0:47 | Reserved | R | N/A | 0's |
| 48:59 | BUID/Interrupt Level Base | R/W | No | 0's |
| 60:63 | Must be set to zero by software | R/W | No | 0's |

Another register that should be discussed is the "Event Queue Multi-Event Queue Link Register". This register is part of the EQ context. An example of the bit assignments for this register is shown in Table 3 below. In one embodiment of the present invention, there is only one such register for each EQ supported by the HCA. The Event Queue Multi-Event Queue Link register points to another EQ, allowing a single event to be placed on multiple EQs. In turn, each of the multiple EQs can generate an interrupt for the one event placed on the multiple EQs. In such way, it can be arranged for certain events placed on multiple EQs to cause multiple interrupts to be generated and broadcasted or otherwise distributed to multiple processors and/or multiple threads on one processor. The multiple interrupts help assure that the event that triggers the interrupts is serviced timely.

When the multi-event queue link valid bit is set in the event queue control register, this register is used to determine the next EQ to update. Any number of EQs can be linked together. Linkage stops when the first EQ is encountered with the multi-event queue link valid bit set to zero. When using the multi-event queue link mechanism for completion events, the interrupt timer for all linked-to EQs (EQ targets specified in multi-event queue link registers) must be disabled. This register must be written by software when the EQ is created.

TABLE 3

Event Queue Multi-Event Queue Link Register Bit Assignments

| Bits | Meaning | Software access | Hardware Updated? | Default Value |
|---|---|---|---|---|
| 0 | Enable Multi-Event Queue Link | R/W | No | 0's |
| 1:47 | Reserved | R | N/A | 0's |
| 46:63 | EQ Number of next EQ to update | R/W | No | 0's |

While the invention has been described with reference to certain preferred embodiments thereof, those skilled in the art will understand the many modifications and enhancements which can be made without departing from the true scope and spirit of the invention, which is limited only by the appended claims.

What is claimed is:

1. An information processing system, comprising:
   an interrupt table including a plurality of entries relating to interrupts requested by event entries recorded in a plurality of event queues, said entries of said interrupt table referencing identifiers belonging to a plurality of pools, each said identifier being assigned to one of said event entries from a pool of identifiers corresponding only to a predetermined event queue in which said event entry is recorded.

2. The information processing system as claimed in claim 1, wherein said identifiers include bus unit identifiers.

3. The information processing system as claimed in claim 1, wherein said identifiers include priority information.

4. The information processing system as claimed in claim 2, wherein at least some of said identifiers referenced by said entries of said interrupt table include identical bus unit identifiers for event entries from first and second ones of said event queues.

5. The information processing system as claimed in claim 4, wherein at least some of said identifiers referenced by said entries of said interrupt table for said event entries from said first and second ones of said event queues include identical priority information.

6. The information processing system as claimed in claim 5, wherein said identical priority information includes an identical LEVEL identifier.

7. The information processing system as claimed in claim 1, wherein said identifiers are global identifiers.

8. The information processing system as claimed in claim 1, wherein said information processing system is operable to return said identifiers to said corresponding pools after interrupts corresponding to said entries of said interrupt table have been handled.

9. The information processing system as claimed in claim 8, wherein said information processing system is operable to reassign said returned identifiers from said corresponding pools to second entries of said interrupt table after said entries of said interrupt table have been handled.

10. The information processing system as claimed in claim 1, further comprising a plurality of processors, wherein said entries of said interrupt table identify ones of said processors for handling said interrupts.

11. The information processing system as claimed in claim 1, wherein said interrupt table entries include information concerning a status of handling said interrupts.

12. An information processing system, comprising:
a plurality of event queues each containing a plurality of event entries, at least some of said event entries having information for generating interrupts; and
an interrupt table including a plurality of interrupt table entries relating to interrupts requested by event entries recorded in said plurality of event queues, said interrupt table entries referencing identifiers belonging to a plurality of pools, each said identifier being assigned to one of said event entries from a pool of identifiers corresponding to only a predetermined event queue in which said event entry is recorded, wherein at least a first event entry of one of said event queues references a second event entry of another one of said event queues, and said first and said second event entries include information for generating first and second interrupts for a single event, such that said first and second entries permit first and second interrupts to be generated for said single event.

13. The information processing system as claimed in claim 12, wherein said interrupt table is arranged as a circular queue.

14. A method of processing interrupts in an information processing system, comprising:
providing an interrupt table including a plurality of entries relating to interrupts requested by event entries in a plurality of event queues, said entries of said interrupt table referencing identifiers belonging to a plurality of pools, and
assigning one of said identifiers to an event entry from a pool of identifiers corresponding to only a predetermined event queue in which said event entry is recorded.

15. The method as claimed in claim 14, wherein said identifiers include bus unit identifiers.

16. The method as claimed in claim 14, wherein at least some of said identifiers referenced by said entries of said interrupt table include identical bus unit identifiers for event entries from first and second ones of said event queues.

17. The method as claimed in claim 16, wherein at least some of said identifiers referenced by said entries of said interrupt table for said event entries from said first and second ones of said event queues include identical priority information.

18. The method as claimed in claim 17, wherein said identical priority information includes an identical LEVEL identifier.

19. The method as claimed in claim 14, wherein said identifiers are global identifiers.

20. The information processing system as claimed in claim 1, wherein each of said identifiers is assigned to one of said event entries in accordance with an order in which said event entries are recorded in said event queue.

* * * * *